Oct. 20, 1942.   R. W. LUCE   2,299,158
GANG CHANNEL FASTENER
Filed Feb. 18, 1941
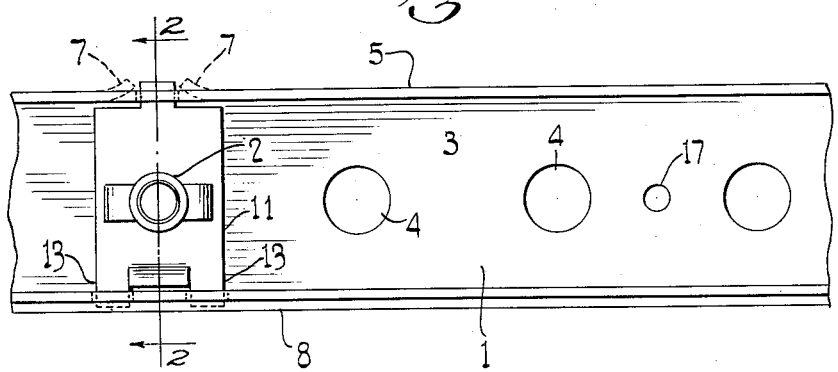
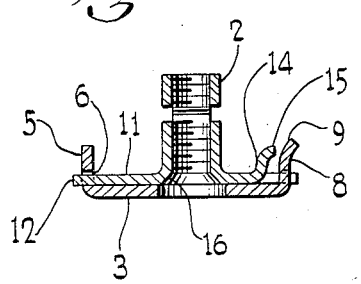
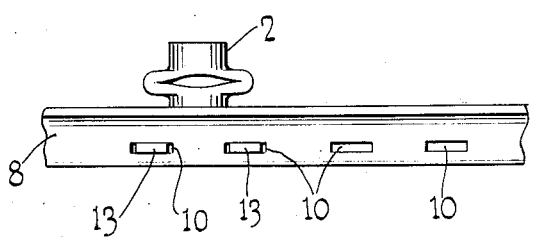
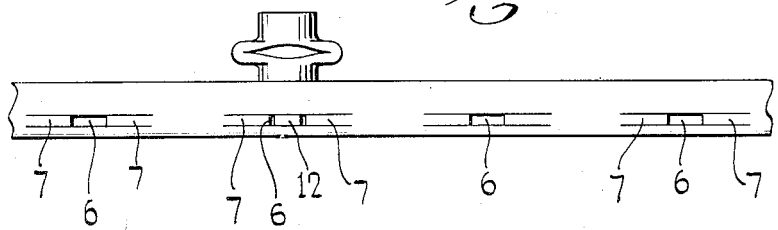
INVENTOR.
RICHARD W. LUCE
BY George T. Gill
ATTORNEY Patented Oct. 20, 1942

2,299,158

UNITED STATES PATENT OFFICE 2,299,158

GANG CHANNEL FASTENER

Richard W. Luce, Southport, Conn.

Application February 18, 1941, Serial No. 379,406

10 Claims. (Cl. 85—32)

The invention herein disclosed relates to a nut structure of the kind commonly known in the aircraft industry as a gang channel nut.

These gang channel nut structures are commonly employed where a so-called blind fastening is required. Such a condition exists where, for example, a plate is secured to a structure and when in position, the plate overlaps and renders the structure inaccessible. Commonly a gang channel nut structure or like fastening means is utilized in such arrangements when the structure to which the plate is secured is of such light construction that it cannot sustain retaining threads and nuts must be employed behind the structure where they may be completely inaccessible when the plate is in position on the structure. This condition is frequently encountered in airplanes, and other like conditions are met with in automobiles and window trim, for example.

The gang channel meets the requirements for such conditions. It consists of a channel or strip of some form which holds a plurality of fastening elements spaced apart and in the case of nuts constrained against rotation. This strip may be used in various ways. For the specific condition described, it may be riveted to the structure to which the plate is to be secured with the nuts free for limited movement and substantially aligned with the holes through which the bolts or studs extend.

In prior structures of this kind, the nuts or other fasteners have been inserted from the end of the channel, the legs or flanges of which have inward extensions overlying extensions on the nuts. In this way the nuts are retained in the channel and various arrangements have been utilized to position and space the nuts in the channel. With such prior structures, it is impossible to replace a nut without removing all the nuts on one side of it or where this is impractical, because of the positioning and spacing means employed, without injuring the channel.

By the invention herein disclosed, there is provided a gang channel nut structure in which each nut may be readily and easily removed and replaced. In accordance with one form of the invention, the retaining channel and each nut is provided with releasable, interengaging means. This interengaging means is such as to retain the nut in the channel, constrain it against rotation and position it with limited movement in the channel. At the same time, the interengaging means is such that it may be readily released to permit the removal and replacement of any nut without disturbing any of the other nuts.

Such a gang channel nut structure, constituting one specific embodiment of the invention, is disclosed in the accompanying drawing and described in detail below.

The drawing includes:

Fig. 1, which is a plan of a portion of a gang channel nut structure;

Fig. 2, which is a section taken on the line 2—2 of Fig. 1;

Fig. 3, which is a side elevation; and

Fig. 4, which is a side elevation.

In general, the gang channel nut structure illustrated includes a channel or trough-shaped strip 1 and a plurality of fastening devices such as the nut 2 within the channel. These channels are made in various lengths and may be made in standard lengths or to suit the particular requirements. The nuts are spaced apart in the channel uniformly but the distance from center to center may vary for particular applications.

The channel strip illustrated includes a web 3 that is punched to form holes 4, spaced in accordance with the desired spacing of the nuts. From one side of the web, the leg or flange 5 extends. At spaced intervals, in alignment with the transverse center line of each openings 4, the flange 5 is pierced to form rectangular openings 6 adjacent the web. On each side of each such opening a resilient tongue 7 is formed. The other flange 8 of the channel is slightly wider than the flange 5 and adjacent its outer edge it is rolled outwardly as at 9 to provide a lead-in. This flange is pierced to form a pair of rectangular openings 10 for each nut spacing.

At each opening through the web of the channel, there is a nut, only one of which, the nut 2, is shown. The particular nut illustrated is made from sheet metal and in the form of the lock-nut illustrated in my co-pending application Serial No. 288,266, filed August 4, 1939. The nut is formed with a flat base 11 at one end of which a tongue 12 is formed. The tongue 12 is slightly smaller than the opening 6 in which it is received. At the opposite end of the base, there is a pair of tongues 13 that are received in the openings 10 in the flange 8. These lugs or tongues 13 are also of less width than the openings in which they are received. Between the tongues 13, the metal 14 of the base is bent upwardly and at the outer edge, outwardly, to form a detent 15. The end of the nut is chamfered as at 16 and the opening 4 in the web of the channel is larger than the bore of the nut.

To remove a nut, such as the nut 2, it is only necessary to insert the end of a screwdriver between the detent 15 and the channel flange 8 and pry the nut out. This action shifts the nuts in the direction of the flange 5. The resilient tongues 7 bend as shown in broken lines in Fig. 1 and permit movement of the nut to release the tongues 13. The corresponding end of the nut may then be lifted and the nut removed. To replace the nut, the tongue 12 is first inserted in the slot 6 and the nut is then pressed past the lead-in 9 on the flange 8. When the lugs 13 become aligned with the openings 10, the resilient tongues 7 return to their normal position, moving the nut into the position illustrated with the lugs 12 and 13 in the corresponding slots or openings.

The lugs 12 and 13 are smaller in width than the slots in which they are received and the base 2 is of less width than the web of the channel to permit limited movement of the nut in the channel. This limited movement of the nut together with the oversize of the opening 4 accommodates for slight inaccuracies in the spacing of the plate or other piece to be fastened by means of the gang channel nut and cooperating screws.

At spaced intervals openings such as the opening 17 are provided for riveting the channel to a structure. Commonly, the channel is riveted to a structure with the web in contact with the blind side of the structure and the openings 4 aligned with openings through the structure. Thus, in securing a plate, for example, to such a structure, the bolt or screw passes through an opening in the plate, an opening in the structure, an opening 4 in the web and into the nut.

From the foregoing description of the embodiment of the invention illustrated in the drawing, it will be seen that by this invention there is provided a gang channel nut structure that is simple in construction, effective in use and one in which each nut is held in place by releasable interengaging means that retain the nut in the channel, constrain it against rotation and position the nut therein with limited movement. The form and shape of the channel and nut are such that they are readily fabricated on automatic machinery and the nuts are easily assembled in the channel.

It will be obvious that various changes may be made by those skilled in the art in the details of the embodiment illustrated and described within the principle and scope of the invention as expressed in the appended claims.

I claim:

1. A gang channel nut structure comprising in combination a channel-shaped strip and a plurality of nuts within the channel, interengaging means on the channel and each nut for retaining each nut in the channel and positioned therein with limited movement, said interengaging means including resilient portions deformable for inserting and removing the nut from the channel.

2. A gang channel nut structure comprising in combination a channel-shaped strip and a plurality of nuts within the channel, interengaging means on the channel and each nut for retaining each nut in the channel and positioning each nut therein with limited movement, said channel having a resilient side portion expansible at each nut for inserting and removing nuts from the channel.

3. A gang channel nut structure comprising in combination a channel-shaped strip and a plurality of nuts within the channel, interengaging means on the channel and each nut in the channel for retaining each nut in the channel and positioning each nut therein with limited movement, said interengaging means including recesses formed in the channel, and said channel having a resilient side portion expansible at each such recess for inserting and removing nuts from the channel.

4. A gang channel nut structure comprising in combination a channel-shaped strip and a plurality of nuts within the channel, releasable interengaging means on the channel and each nut, said interengaging means retaining each nut in the channel constrained against rotation and positioned therein with limited movement.

5. A channel nut structure of the kind described comprising in combination a sheet metal channel-shaped strip and a sheet metal nut within the strip including a flange engaging the channel-shaped strip, and releasable interengaging means on the channel and the nut for retaining the nut in the channel and positioned therein with limited movement, said interengaging means including resilient portions deformable for inserting and removing the nut from the channel.

6. A channel nut structure of the kind described comprising in combination a channel-shaped strip and a nut with the strip including a flange for engaging the channel-shaped strip, and releasable interengaging means on the channel-shaped strip and the nut for retaining the nut in the channel and positioned therein with limited movement, said interengaging means including a lug on the nut and a recess in the channel-shaped strip, the channel-shaped strip having a resilient portion expansible to release the lug from the recess.

7. A nut assembly comprising a channel member having a bottom and side portions extending in angular relation to said bottom, a nut member retained within said channel between said side portions, one of said side portions having an opening and said nut member having an integral portion, at least part of which is movable into said opening to retain the nut member in said channel and limit the movement of said nut member relative to said channel.

8. A nut assembly comprising a channel member having a bottom and side portions extending in angular relation to said bottom, a nut member retained within said channel between said side portions, one of said side portions being yieldable and having an opening, said nut having an integral portion, at least a part of which is movable into said opening, and said nut member being movable into retained position with said channel member by reason of the yieldability of said side portion.

9. A nut assembly comprising a channel member having a bottom and side portions extending from said bottom, a nut member retained within said channel between said side portions, one of said side portions having an integral resilient element, and said nut being snapped by said resilient element into said retained position.

10. A nut assembly comprising a channel member having a bottom and side portions extending from said bottom, a nut member having a base retained within said channel between said side portions and a threaded shank extending from the base, one of said side portions having an integral resilient element, and said base being snapped by said resilient element into said retained position.

RICHARD W. LUCE.